Jan. 18, 1949.   E. P. SEAMAN   2,459,459
SELF-EMPTYING ASH TRAY FOR AUTOMOBILES
Filed July 1, 1946
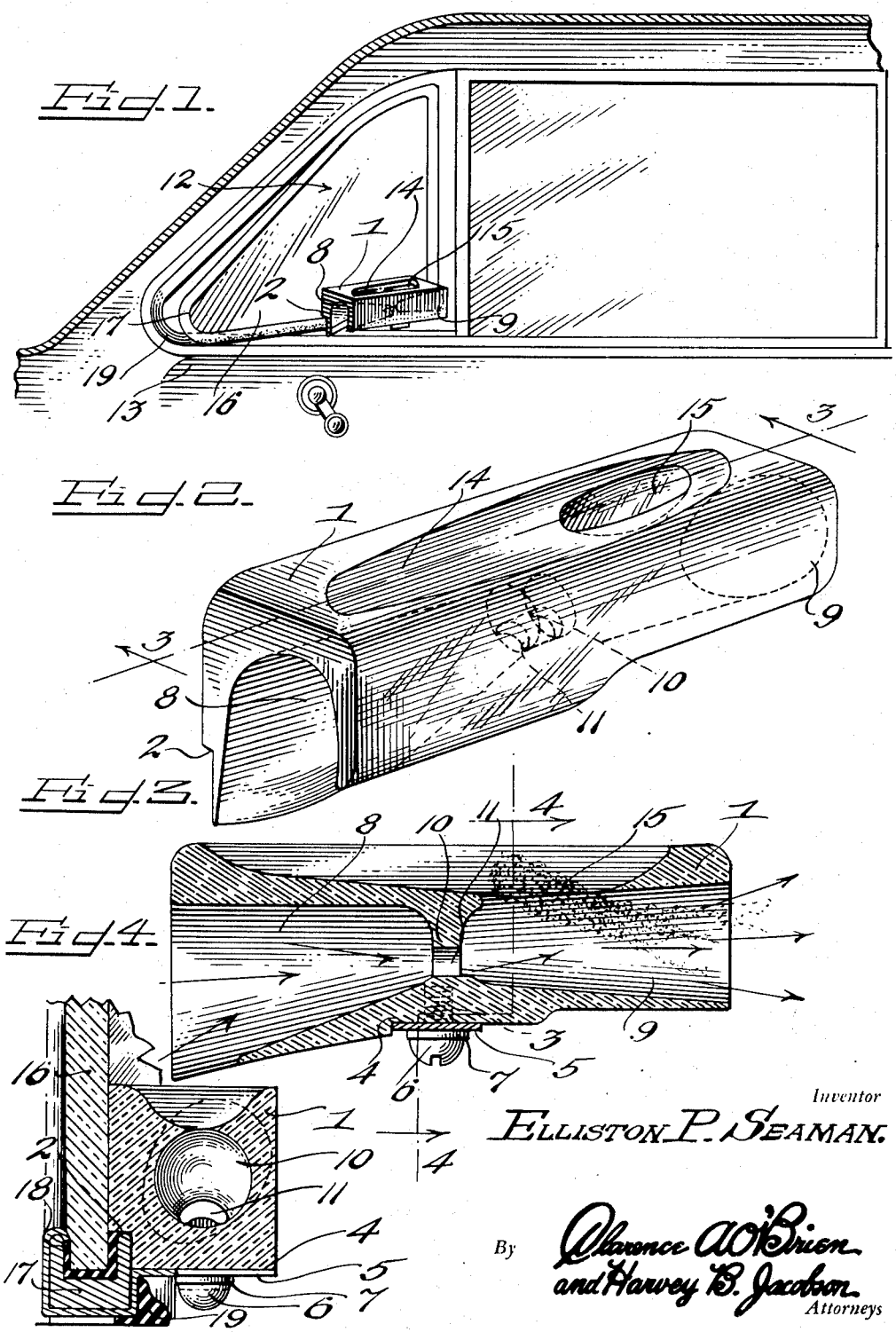
Inventor
ELLISTON P. SEAMAN.
By Clarence A. O'Brien
and Harvey B. Jacobson
Attorneys Patented Jan. 18, 1949

2,459,459

UNITED STATES PATENT OFFICE 2,459,459

SELF-EMPTYING ASH TRAY FOR AUTOMOBILES

Elliston P. Seaman, Williamsport, Pa.

Application July 1, 1946, Serial No. 680,662

1 Claim. (Cl. 206—19.5)

This invention relates to improvements in self-cleaning ash trays for automobiles.

An object of the invention is to provide an improved self-cleaning ash tray for automobiles which will be secured to either or both the right and left side quarter swinging windows at the front or rear of an automobile to automatically and positively eject cigarette ashes from the ash tray when placed therein while the automobile is in motion or while not in motion.

Another object of the invention is to provide a plastic self-cleaning ash tray for automobiles which will act on the aspiration principle when the automobile is in motion and when the ventilating quarter windows in the front doors of the automobile are opened or cracked, due to the rush of air entering along the rubber window gasket and into the forward end of the ash tray and through the moon shaped restricted aperture positioned forwardly of the inlet for the ashes.

A further object of the invention is to provide an improved self-cleaning ash tray for automobiles which will be secured to the inner rear edge of either or both of the quarter swinging ventilating windows of the front doors of an automobile whereby the air passing through a restricted centrally disposed moon shaped opening will aspirate or inject and discharge ashes when placed in the ash receiving aperture to the rear of the said restricted opening.

Another object of the invention is to provide an improved self-cleaning ash tray for automobiles which will be highly efficient in operation, and relatively inexpensive to manufacture and produce.

Other objects will appear as the description proceeds.

In the accompanying drawings which form a part of this application,

Figure 1 is a perspective view of the improved self-cleaning ash tray applied to the right side quarter window of an automobile;

Figure 2 is a perspective view of the improved self-cleaning ash tray;

Figure 3 is a longitudinal sectional view taken on the line 3—3 of Figure 2, and Figure 4 is a transverse sectional view taken on the line 4—4 of Figure 3.

Like characters of reference are used throughout the following specification and the accompanying drawings to designate corresponding parts.

In carrying out the invention, there is provided an improved self-cleaning ash tray for automobiles including an elongated body 1 formed with a longitudinally extending positioning seat 2 along its outer and lower edge, said body being formed with a threaded bore 3 in its lower surface approximately midway of its length, and also a transverse seat 4 on which the attaching clip 5 is secured by means of the screw 6 which extends through an aperture in said clip and into said threaded bore 3. A washer 7 will be positioned over the screw 6 between its head and the clip 5.

An upwardly and inwardly extending air inlet bore 8 of decreasing diameter is formed in the forward end of the body 1, and is separated from the outwardly extending flared discharge outlet bore 9 being of increasing diameter, by means of the web portion 10 through which the restricted moon shaped aperture 11 is formed to create an aspiration effect or operation when the ash tray is in position on the forward quarter pivoted window 12 of an automobile door 13 when the automobile is in motion or when not in motion.

An elongated dished depression 14 is formed in the upper surface of the body 1 to extend longitudinally thereof, to provide a seat or support for a burning cigarette (not shown), and an ash outlet port or passage 15 is formed through the body 1 to connect the rear end of the cigarette supporting depression 14 and the adjacent upper and inner end of the flared discharge outlet bore 9, in such a manner that when cigarette ashes are deposited in said port or passage 15, they will be immediately sucked through the said port or passage and discharged through the outlet bore 9 to the outside of the automobile, it being understood that the ash tray may be applied to any quarter pivoted window in the automobile and that when partially opened, the ash tray will function perfectly regardless of whether or not the automobile is in motion.

In attaching the ash tray body 1 to the pivoted quarter window 12, the same will be placed with its outside surface in contact with the inner surface of the glass window 16 at the rear end thereof and with the seat 2 resting upon the upper edge of the metal window frame 17 and the rubber cushioning strip 18 placed between the window 16 and the frame 17, when the window is open. The attaching clip 5 is substantially U-shape in cross-section and will engage the inside of the frame 17 and will extend underneath the same and upwardly in contact with the outer edge thereof, terminating in the inwardly directed hooked end adapted to seat over and lock on the upper edge of the metal frame 17, as clearly illustrated in Figure 4 of the drawings, thus positively locking the ash tray in operative position.

The rubber sealing strip 19 about the frame 17 of the window 16 will serve to direct a stream of air directly into the open end of the inlet bore 8 to cause the ash tray to function when the window is partially opened. The aspiration action will be so strong that not only ashes but also cigarette stubs will be readily removed when placed in the tray.

It will be understood that the improved self-cleaning ash tray may be made in right and left shapes, for attachment to either the right or left pivoted quarter window at the front or rear of an automobile.

The ash tray is preferably formed of a clear plastic, although it may be made from any other suitable and desirable material and in any desired color.

From the foregoing description, it will be apparent that a highly efficient form of self-cleaning ash tray for automobiles will have been provided which will operate on the aspiration or injection principle while the automobile is in motion, said ash tray being positive in acton and relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

An ash disposal receptacle for automotive vehicles comprising a unitary body having a recess in its upper surface forming an ash tray, a longitudinally extending oppositely tapered bore in said body beneath said tray having air adit and exit portions, an integral apertured rib in said body and separating said portions, said tray having an opening in the bottom thereof communicating with said exit portion only, and means for removably attaching said receptacle to a quartered window of the automotive vehicle, said means including a longitudinally recessed seat at the lower edge of said body for engagement with a side and lower edge of a quartered window, a spring clip, and a pin engageable with the lower end of said rib for retaining said clip upon said body.

ELLISTON P. SEAMAN.

REFERENCES CITED

The following references are of record in the file of this patent:

UNITED STATES PATENTS

| Number | Name | Date |
| --- | --- | --- |
| 1,611,437 | Hardesty | Dec. 21, 1926 |
| 2,299,668 | Webster | Oct. 20, 1942 |
| 2,303,980 | Bonbright | Dec. 1, 1942 |
| 2,335,094 | Wesselhoeft | Nov. 23, 1943 |
| 2,364,078 | Kisselle et al. | Dec. 5, 1944 |